UNITED STATES PATENT OFFICE.

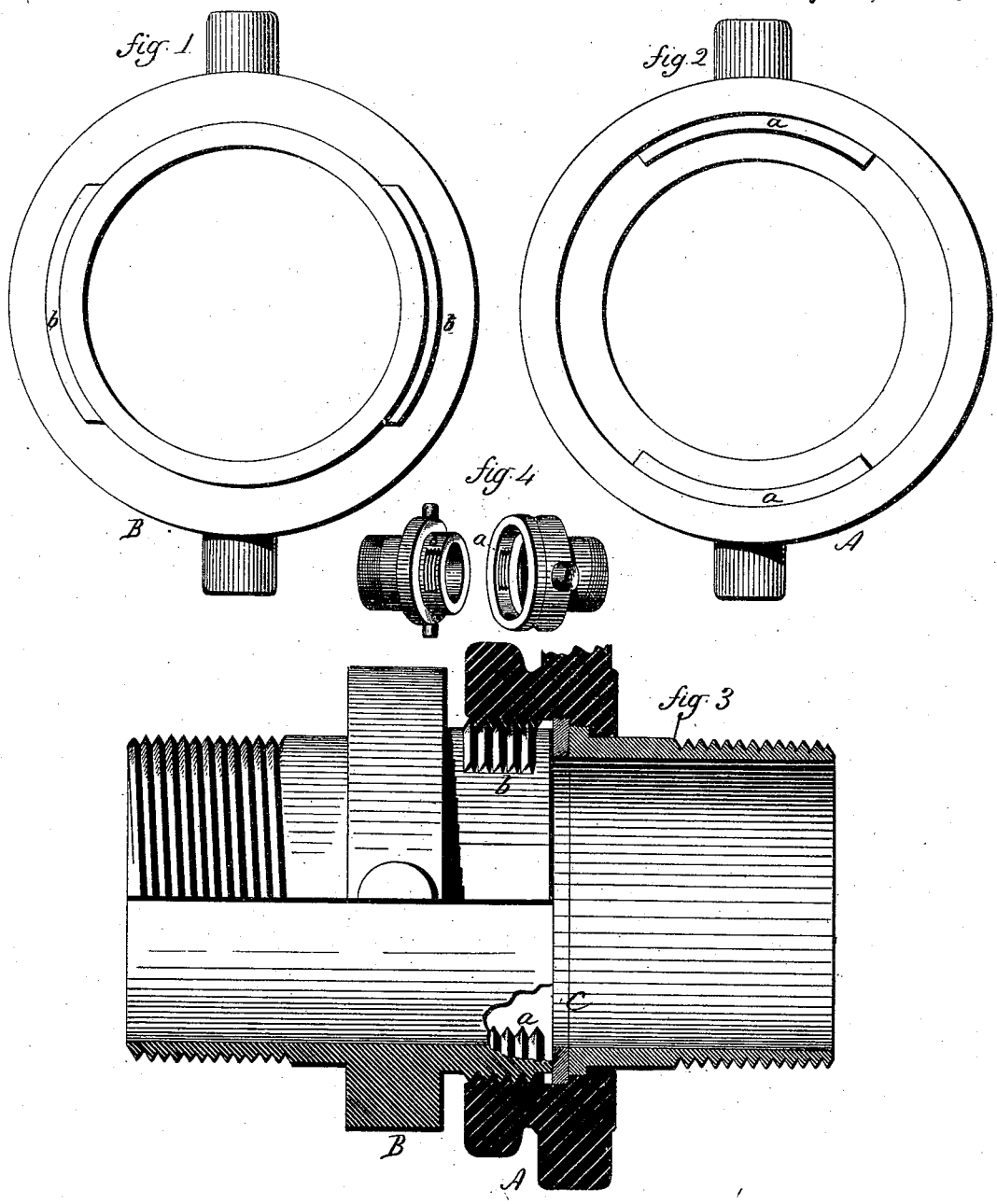

CHARLES F. LITTLEJOHN, OF NEW HAVEN, CONNECTICUT.

IMPROVEMENT IN HOSE-COUPLINGS.

Specification forming part of Letters Patent No. 193,166, dated July 17, 1877; application filed June 12, 1877.

*To all whom it may concern:*

Be it known that I, CHARLES F. LITTLEJOHN, of New Haven, in the county of New Haven and State of Connecticut, have invented a new Improvement in Hose-Coupling; and I do hereby declare the following, when taken in connection with the accompanying drawings and the letters of reference marked thereon, to be a full, clear, and exact description of the same, and which said drawings constitute part of this specification, and represent, in—

Figure 1, an end view of the male part; Fig. 2, an end view of the female part; Fig. 3, a sectional side view of the male part; Fig. 4, a perspective view of the two parts.

This invention relates to an improvement in the device employed for connecting the ends of hose commonly called "hose-coupling," and particularly to that class in which the female part is provided with internal inclined segmental ribs, and the other part with corresponding external inclined segmental ribs, so that the two parts may be set together, and the inclined ribs of the inner part, turned beneath the inclined ribs of the outer part, will, by such inclination, draw the two parts together after the manner of a screw-thread.

In this class of couplings a difficulty is experienced from the fact that the thickness of packing between the two parts can be but slightly varied, because if the packing be too thick, then the ribs will not engage, and if too thin, then no force will be brought upon the packing, it being necessary to bring the ribs on one part into contact with nearly the whole surface of the other part, in order to make a firm connection, and the incline must be light, or the coupling will be too easily detached.

The object of this invention is to overcome these difficulties; and it consists in providing the two parts each with two or more series of corresponding inclined or spiral ribs and intermediate blank spaces, so that either rib of the series on the one part will engage either rib of the series on the other part, all as more fully hereinafter described.

A represents the female part, and B the male part, of the coupling. Internally the part A has formed upon its surface two or more series of ribs, *a*, these ribs circumferentially inclined, substantially like the threads of a screw, and each rib parallel with the others. The length of each series is immaterial, it only being essential that there should be a space between the series.

On the exterior of the part B there are formed similar series of ribs *b*, corresponding to the series *a* on the other part, and in length slightly less than the spaces between the series in the part A, and so that the two may be set together, the series of ribs *b* passing between the series of ribs *a* on the other part, and when so set together, the turning of one part interlocks the ribs of that part with the ribs of the other part, in like manner as the threads of a screw, the part B being first set against the packing C within the other part. The turning of the parts therefore forces the inner onto the packing C to pack the joint.

In consequence of the series of ribs, any thickness of packing may be employed—as, for instance, the packing C, as illustrated in Fig. 3, is of such thickness that the ribs of the inner part engage all the ribs except the extreme inner rib on the outer part. Suppose, then, this packing to be less in thickness, then all the ribs would be engaged. If it be, say, two or three times as thick, then a correspondingly less number of ribs will be engaged, the inner part always first striking the packing, and then turned until it comes to a bearing, which it is sure to meet by contact of some of the ribs of one part with some of the ribs of the other part.

By employing this series of ribs a slight incline may be given to the ribs, hence facilitating the close packing of the joint, as well as preventing accidental separation of the parts, as would be the case with ribs of considerable incline.

I claim—

In a hose-coupling consisting of the two parts A B, the one constructed with two or more internal series of inclined or spiral ribs, with intermediate blank spaces, the other part with corresponding series of external inclined or spiral ribs and blank spaces, and so that the ribs of the one part may enter the spaces of the other part, for the engagement of the ribs of the one part with the ribs of the other part, substantially as described.

CHARLES F. LITTLEJOHN.

Witnesses:
JOHN E. EARLE,
CLARA BROUGHTON.